(12) United States Patent
Taha et al.

(10) Patent No.: US 12,199,553 B2
(45) Date of Patent: Jan. 14, 2025

(54) VARIABLE TERRAIN SOLAR TRACKER

(71) Applicant: NEVADOS ENGINEERING, INC., San Francisco, CA (US)

(72) Inventors: Yezin Taha, San Francisco, CA (US); Kyam Krieger, San Francisco, CA (US); Jared Niemiec, San Francisco, CA (US)

(73) Assignee: NEVADOS ENGINEERING, INC., Oakland, CA (US)

( * ) Notice: Subject to any disclaimer, the term of this patent is extended or adjusted under 35 U.S.C. 154(b) by 0 days.

(21) Appl. No.: 18/088,754

(22) Filed: Dec. 26, 2022

(65) Prior Publication Data

US 2023/0208349 A1    Jun. 29, 2023

Related U.S. Application Data

(63) Continuation of application No. 16/339,820, filed as application No. PCT/US2017/056667 on Oct. 13, 2017, now Pat. No. 11,539,325.

(60) Provisional application No. 62/468,228, filed on Mar. 7, 2017.

(51) Int. Cl.
   *H02S 20/32*    (2014.01)
   *F24S 30/40*    (2018.01)
   *H02S 20/10*    (2014.01)

(52) U.S. Cl.
   CPC .............. *H02S 20/32* (2014.12); *F24S 30/40* (2018.05); *H02S 20/10* (2014.12)

(58) Field of Classification Search
   CPC ........... H02S 20/32; H02S 20/10; F24S 30/40
   See application file for complete search history.

(56) References Cited

U.S. PATENT DOCUMENTS

| | | | |
|---|---|---|---|
| 11,539,325 B2 | 12/2022 | Taha et al. | |
| 2003/0034029 A1* | 2/2003 | Shingleton | H02S 20/30 126/600 |
| 2003/0083136 A1 | 5/2003 | Park | |
| 2008/0251115 A1 | 10/2008 | Thompson et al. | |
| 2010/0139647 A1* | 6/2010 | Silvestre Mata | F24S 30/455 126/604 |
| 2010/0252030 A1* | 10/2010 | Marcotte | F24S 40/80 126/694 |
| 2011/0174295 A1 | 7/2011 | Lumbreras | |
| 2011/0240006 A1* | 10/2011 | Linke | H02S 20/32 126/600 |

(Continued)

FOREIGN PATENT DOCUMENTS

| | | | |
|---|---|---|---|
| CN | 201386742 Y | * | 1/2010 |
| CN | 203788228 U | * | 8/2014 |

(Continued)

OTHER PUBLICATIONS

CN-201386742-Y English machine translation (Year: 2010).*

(Continued)

*Primary Examiner* — Andrew J Golden
(74) *Attorney, Agent, or Firm* — Schmidt Patent Law, Inc.

(57) ABSTRACT

Solar trackers that may be advantageously employed on sloped and/or variable terrain to rotate solar panels to track motion of the sun across the sky include bearing assemblies configured to address mechanical challenges posed by the sloped and/or variable terrain that might otherwise prevent or complicate use of solar trackers on such terrain.

17 Claims, 12 Drawing Sheets

(56) References Cited

U.S. PATENT DOCUMENTS

| | | | | |
|---|---|---|---|---|
| 2011/0315197 A1* | 12/2011 | Angoli | ............... | F24S 30/455 |
| | | | | 136/246 |
| 2014/0054433 A1 | 2/2014 | Reisch | | |
| 2014/0216522 A1 | 8/2014 | Au | | |
| 2015/0000721 A1 | 1/2015 | Au | | |
| 2018/0091089 A1* | 3/2018 | Lange | ................... | H02S 20/32 |

FOREIGN PATENT DOCUMENTS

| | | | |
|---|---|---|---|
| KR | 896523 B1 * | 5/2009 | |
| WO | 2016/094864 A1 | 6/2016 | |

OTHER PUBLICATIONS

KR-896523-B1 English machine translation (Year: 2009).*
CN-203788228-U English machine translation (Year: 2014).*
International Search Report corresponding to PCT/US2017/056667, dated Dec. 7, 2017, 1 page.

* cited by examiner

VARIABLE TERRAIN SOLAR TRACKER

CROSS REFERENCE TO RELATED APPLICATIONS

This application is a continuation of U.S. application Ser. No. 16/339,820 titled "Variable Terrain Solar Tracker" filed Apr. 5, 2019, which is a U.S. National Phase application under 35 U.S.C. 371 of International Patent Application No. PCT/US2017/056667 titled "Variable Terrain Solar Tracker" and filed Oct. 13, 2017, which claims benefit of priority to U.S. Provisional Patent Application No. 62/468,228 titled "Variable Terrain Solar Tracker" filed Mar. 7, 2017. All of the above applications are incorporated herein by reference in their entirety.

FIELD OF THE INVENTION

The invention relates generally to solar trackers.

BACKGROUND

Two types of mounting systems are widely used for mounting solar panels. Fixed tilt mounting structures support solar panels in a fixed position. The efficiency with which panels supported in this manner generate electricity can vary significantly during the course of a day, as the sun moves across the sky and illuminates the fixed panels more or less effectively. However, fixed tilt solar panel mounting structures may be mechanically simple and inexpensive, and in ground-mounted installations may be arranged relatively easily on sloped and/or uneven terrain.

Single axis tracker solar panel mounting structures allow rotation of the panels about an axis to partially track the motion of the sun across the sky. For example, a single axis tracker may be arranged with its rotation axis oriented generally North-South, so that rotation of the panels around the axis can track the East-West component of the sun's daily motion. Alternatively, a single axis tracker may be arranged with its rotation axis oriented generally East-West, so that rotation of the panels around the axis can track the North-South component of the sun's daily (and seasonal) motion. Solar panels supported by single axis trackers can generate significantly more power than comparable panels arranged in a fixed position.

A difficulty with conventional single-axis trackers is that ground mount installations may require significant grading and a relatively flat parcel of land in order for the trackers to be easily arranged and operated. For example, the distance between a single rotation axis extending over uneven terrain and the ground below would vary along the length of the rotation axis, mechanically complicating installation and operation of the tracker. Further, for a conventional single axis tracker arranged on sloping land with its rotation axis oriented at an angle to the horizontal, a single supporting structure (e.g., support post) may be required to support a force (slope load) that has accumulated along the length of the rotation axis from the weight of the tracker. For example, the slope load may be entirely born by the post at the lowest end of the axis, or by the post at the highest end of the axis, or by a centrally located slew drive support post. These difficulties with conventional single-axis trackers are particularly disadvantageous in view of the increased power generation for a single-axis tracker installed on a sun-facing slope, for example a South-facing slope in the Northern Hemisphere.

Consequently, there is a need for an improved solar panel mounting structure that can be installed on sloped and/or uneven terrain and provide for single axis rotation of solar panels.

SUMMARY

Solar trackers that may be advantageously employed on sloped and/or variable terrain to rotate solar panels to track motion of the sun across the sky include bearing assemblies configured to address mechanical challenges posed by the sloped and/or variable terrain that might otherwise prevent or complicate use of solar trackers on such terrain.

A solar tracker comprises a first solar panel support configured to support a first solar panel assembly, a first support post, and a first bearing assembly attached to the first support post and supporting a first end of the first solar panel support. The first bearing assembly enables rotation of the first solar panel support around a first rotation axis. The first bearing assembly comprises an axial load bearing surface (for example, a thrust bearing) arranged to support an axial load from the first solar panel support directed along the first rotation axis and transfer the axial load through the first bearing assembly to the first support post.

The first bearing assembly may comprise a slip joint attaching the first solar panel support to the first bearing assembly and accommodating relative motion between the first solar panel support and the first bearing assembly. The relative motion may result for example from expansion and contraction of the first solar panel support or from displacement of the first solar panel support with respect to the first bearing assembly. The relative motion may be, for example, along the first rotation axis.

In some variations, the solar tracker comprises a second solar panel support configured to support a second solar panel assembly. The first bearing assembly supports a first end of the second solar panel support on an opposite side of the first bearing assembly from the first solar panel support, enables rotation of the second solar panel support around a second rotation axis that is arranged in line with the first rotation axis, and couples the first solar panel support to the second solar panel support so that that rotation of the first solar panel support causes rotation of the second solar panel support.

In some variations, the solar tracker comprises a second solar panel support configured to support a second solar panel assembly, the first bearing assembly supports a first end of the second solar panel support, and the first bearing assembly comprises an articulating joint. The articulating joint enables rotation of the first solar panel support around the first rotation axis, enables rotation of the second solar panel support around a second rotation axis that intersects with the first rotation axis at a location within the first bearing assembly at an angle greater than zero, and couples the first solar panel support to the second solar panel support so that rotation of the first solar panel support around the first rotation axis causes rotation of the second solar panel support around the second rotation axis.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention.

As used in this specification and the appended claims, the singular forms "a," "an," and "the" include plural referents unless the context clearly indicates otherwise. Also, the term "parallel" is intended to mean "substantially parallel" and to encompass minor deviations from parallel geometries. The term "vertical" refers to a direction parallel to the force of the earth's gravity. The term "horizontal" refers to a direction perpendicular to "vertical".

This specification discloses solar trackers that may be advantageously employed on sloped and/or variable terrain to rotate solar panels to track motion of the sun across the sky. As described in more detail below, these solar trackers may include, for example, various combinations of articulated joints, slip joints, and thrust bearings to address mechanical challenges posed by sloped and/or variable terrain that might otherwise prevent or complicate use of solar trackers on such terrain.

Figures 1A, 1B:
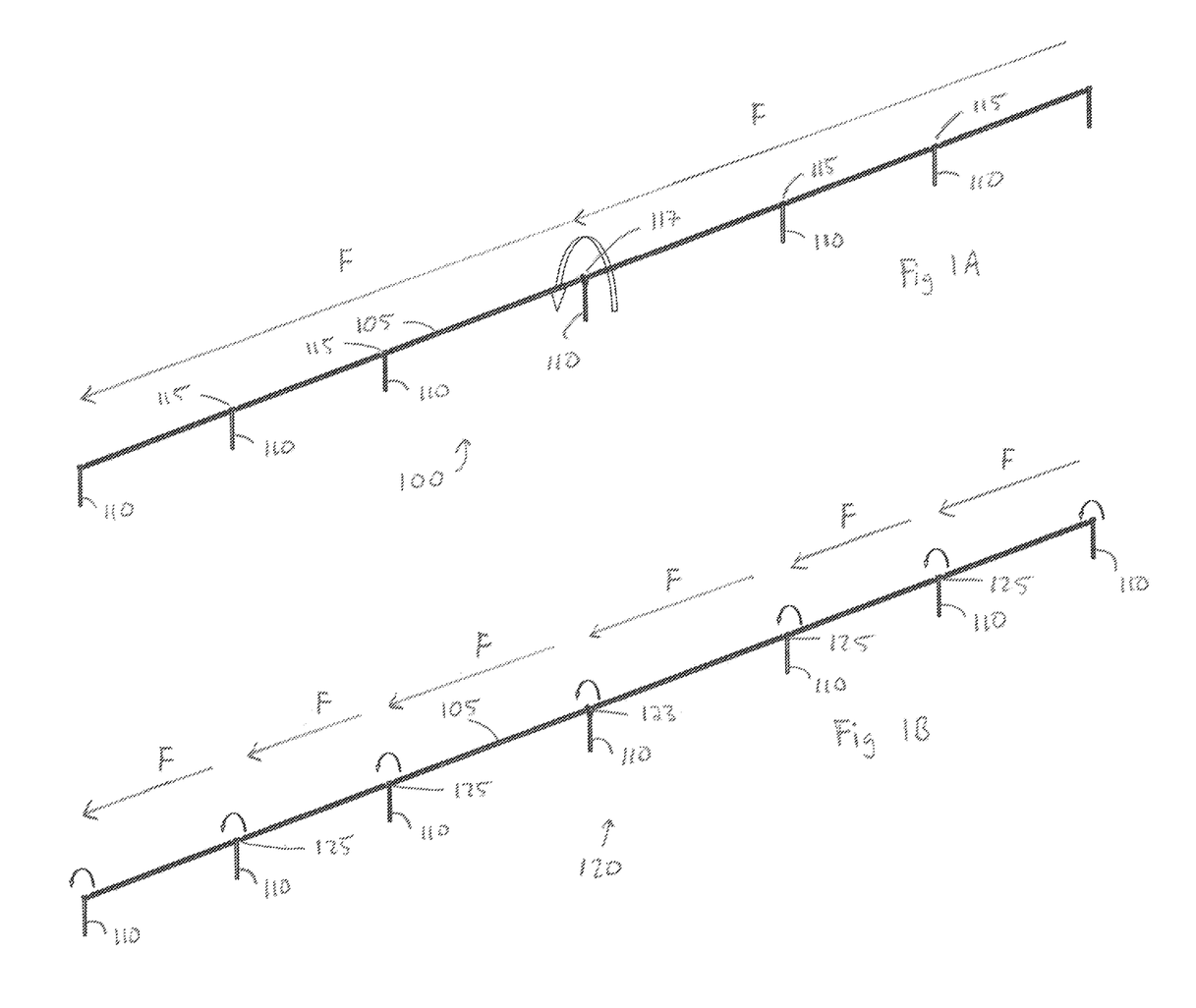
FIG. 1A shows an example of a solar tracker having a conventional configuration arranged on sloping terrain. A slope load accumulates along the tracker and is primarily supported by a middle support post.
FIG. 1B shows an example of a variable terrain solar tracker as disclosed herein arranged on sloping terrain. The slope load is distributed between support posts along the length of the tracker.

Referring to FIG. 1A, an example conventional single axis solar tracker 100 includes a torque tube 105 or other longitudinal support defining a rotation axis about which solar panels (not shown) attached to the tracker may be rotated to track the sun. Torque tube 105 is supported by a plurality of support posts 110 via conventional pass-through rotation bearing assemblies 115 which allow rotation of the torque tube around its axis, and driven by a slew drive 117 mounted on a centrally located support post. Torque tube 105 is free to slide through pass-through bearing assemblies 115 along the coincident rotation axis of the torque tube and the bearings. When such a conventional single axis tracker is installed on a slope with the torque tube at an angle to the horizontal as shown in FIG. 1A, pass through bearing assemblies 115 and the support posts to which they are attached bear a portion of the vertical component of the force of gravity on the tracker but do not support slope load forces F that run parallel to the rotation axis of the tracker along the torque tube. Instead, in the illustrated example the slope load forces accumulate along the tracker and are born primarily by slew drive assembly 117 and its support post. The upper portion of the tracker pushes on slew drive 117, and the lower portion of the tracker pulls on slew drive 117 in the same direction. This requires the slew drive support post to be significantly stronger, and likely heavier and more expensive, than the other support posts. In addition, this arrangement risks a loss of soil stability around the slew drive support post, which could interfere with operation of the tracker or even damage or destroy the tracker.

FIG. 1B shows an example variable terrain solar tracker 120 in which the torque tube 105 is supported by bearing assemblies 125 that include thrust bearings, and driven by a slew drive 123 mounted on a centrally located support post. Thrust bearings are bearings that permit rotation around an axis while supporting a load directed along the rotation axis. The tracker rotation axis may be coincident with the torque tube, or offset from but parallel to the torque tube. In the example of FIG. 1B, the slope load does not accumulate along the length of the tracker. Instead, bearing assemblies 125 each isolate the slope load from a section of torque tube 105 onto a respective support post 110 so that multiple sections of the tracker do not pull or push in the same direction on a single post. In some configurations, for example on terrain exhibiting more than one slope (e.g., the slope changes), multiple sections of a tracker may pull or push in opposite directions on a single post, which reduces the total thrust load on the post. With the use of thrust bearings as just described, the overturning moment (shown by the curved arrows) required to rotate the torque tube is also correspondingly reduced and distributed, compared to the conventional configuration shown in FIG. 1A.

More generally, depending on the terrain variability different connection joints may be used between sections of a variable terrain solar tracker as disclosed herein. Along relatively planar sloping terrain straight-through bearing assemblies as described below may be used. Straight-through bearing assemblies maintain a straight driveline through the post connection but include thrust bearings to isolate the slope load from a section of the tracker. Along relatively planar horizontal terrain conventional pass-through bearing assemblies lacking thrust bearings may be used. When a change in the terrain slope angle occurs an articulating bearing assembly as described below may be used to link two rotation axes oriented at different angles to the horizontal. Articulating bearing assemblies may include thrust bearings to isolate slope load. Rotation of the tracker may be driven by a slew drive located at an end of the tracker, or at an intermediate position along the tracker.

Figure 2:
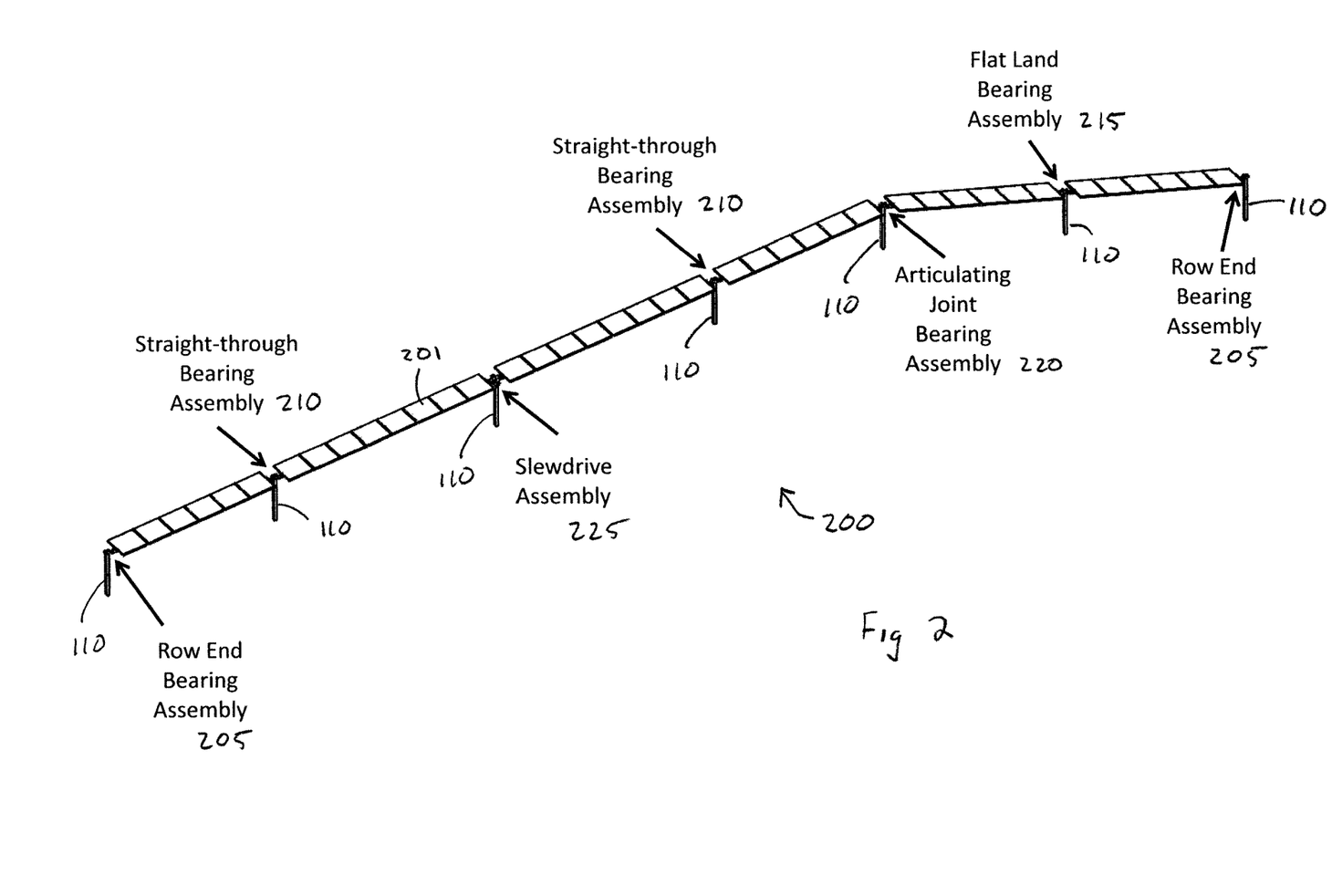
FIG. 2 shows another example of a variable terrain solar tracker as disclosed herein, arranged on uneven terrain.

FIG. 2 shows an example variable terrain solar tracker 200 employing several different bearing assemblies as just described. Example tracker 200 is arranged on uneven terrain and includes two rotation axes: a first rotation axis arranged along a slope, and a second horizontal rotation axis along a flat portion of land above the slope. Opposite ends of the tracker are rotationally supported by row end bearing assemblies 205 on support posts 110. The portion of the tracker arranged on the slope is supported by straight-through bearing assemblies 210, which as noted above include thrust bearings that isolate and transmit portions of the slope load to corresponding support posts 110. The portion of the tracker arranged on flat land, above the slope, is rotationally supported by a flat land bearing assembly 215 which may be a conventional pass-through bearing assembly lacking thrust bearings as described above. Slew drive assembly 225 drives rotation of the solar panels about the first and second rotation axes to track the sun. Articulating joint bearing assembly 220 links the two non-collinear rotation axes and transmits torque between them. Example configurations for bearing assemblies 205, 210 and 220 are described in more detail below.

Other variations of the variable terrain solar tracker 200 may include other combinations of bearing assemblies 205, 210, 215, and 220 arranged to accommodate one, two, or more linked rotational axes arranged along terrain exhibiting one or more sloped portions and optionally one or more horizontal (flat) portions. Two or more such trackers may be arranged, for example next to each other in rows, to efficiently fill a parcel of sloped and/or uneven terrain with electricity-generating single axis tracking solar panels.

Referring again to FIG. 2, as noted above articulating joint bearing assembly 220 accommodates a change in direction of the rotational axis along the tracker. As used herein, "articulating joint" refers to a joint that can receive torque on one axis of rotation and transmit the torque to a second axis of rotation that has a coincident point with the first axis of rotation. This joint can be inserted between two spinning rods that are transmitting torque to allow the second spinning rod to bend away from the first spinning rod without requiring the first or second spinning rod to flex along its length. One joint of this type, which may be used in articulating joint bearing assemblies as described herein, is called a Hooke Joint and is characterized by having a forked yoke that attaches to the first spinning rod, a forked yoke attached to the second spinning rod, and a four-pointed cross between them that allows torque to be transmitted from the yoke ears from the first shaft into the yoke ears of the second shaft.

Figure 3A:
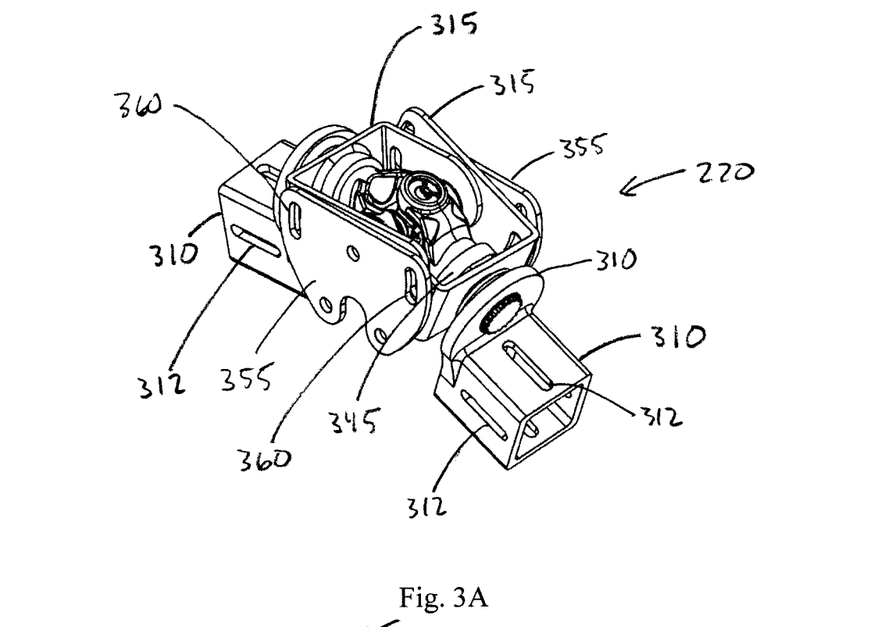
FIG. 3A and FIG. 3B show, respectively, assembled and exploded views of an example articulating joint bearing assemble.
Figure 3B:
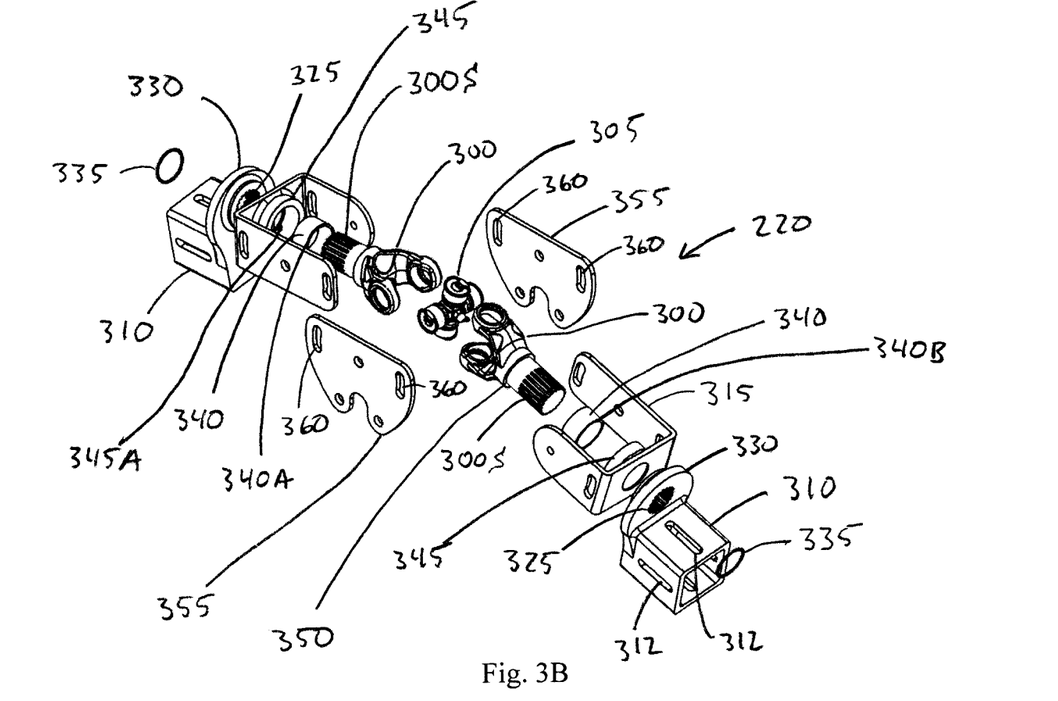

FIG. 3A and FIG. 3B show assembled and exploded views of an example articulating joint bearing assembly 220. In this variation articulating joint bearing assembly 220 includes two forked yokes 300 that are coupled to each other through cross and bearing 305 to transmit torque from one to the other along intersecting first and second rotation axes of a tracker. Bearing assembly 220 further includes two torque tube supports 310 each of which is attached to one of the yokes 300. A torque tube or equivalent longitudinal support (not shown) aligned parallel with and optionally displaced from the first rotation axis may be attached to one torque tube support 310, and another torque tube aligned parallel with and optionally displaced from the second rotation axis may be attached to the other torque tube support 310. In the illustrated example, when attached to the articulating joint bearing assembly the torque tubes (or equivalent longitudinal supports) are aligned parallel with but displaced downward from the rotation axis when the panels they support are oriented horizontally. This configuration allows the rotation axis to lie in or close to the plane of the panels and/or in or close to the center of mass of the tracker, which can simplify operation of the tracker. Axial slots 312 in torque tube supports 310, by which a torque tube may be attached to the torque tube support, provide tolerance in the axial direction for support post placement.

Forked yokes 300 and cross and bearing 305 are enclosed in and supported by two pivoting vertical bearing supports 315. Splined shaft portions 300S on yokes 300 extend through openings 320 in respective pivoting vertical bearing supports 315 along corresponding rotation axes to engage complementary shaped and sized splined openings 325 in attachment plates 330 on torque tube supports 310. Torque tube supports 310 are retained on shaft portions 300S of yokes 300 by retaining rings 335. A splined shaft portion 300S of a yoke 300 in combination with a splined opening 325 in an attachment plate 330 forms a slip joint that transmits torque between shaft portion 300S and torque tube support 310 while allowing relative motion of the torque tube support 310 and shaft portion 300 along the rotation axis.

Rotation bearings 340 fitting over shaft portions 300S of yokes 300 are retained in sleeves 345 of pivoting vertical bearing supports 315 to provide vertical support for yokes 300 while allowing rotation of the yokes about their respective rotation axes.

Figure 3C:
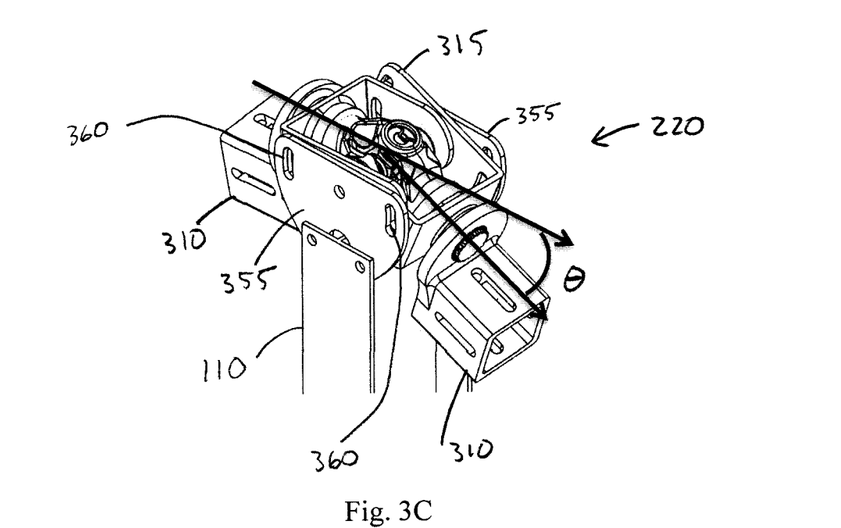
FIG. 3C shows a perspective view of the articulating joint bearing assembly mounted on a support post articulated through an angle θ.

As shown in FIG. 3C, side plates 355 of bearing assembly 220 may be used to attach pivoting vertical bearing supports 315 to a support post 110. Alignment slots 360 in side plates 355 allow the orientation of the rotation axes defined by yokes 300 (shown in the figure as straight arrows) to be adjusted to align them with respect to neighboring bearing assemblies in the tracker and to obtain a desired angle θ between them, while maintaining the support post in a vertical orientation. The angle θ between the two rotation axes may be, for example, ≥0 degrees, ≥5 degrees, ≥10 degrees, ≥15 degrees, ≥20 degrees, ≥25 degrees, ≥30 degrees, ≥35 degrees, ≥40 degrees, ≥45 degrees, ≥50 degrees, ≥55 degrees, ≥60 degrees, ≥65 degrees, ≥70 degrees, ≥75 degrees, ≥80 degrees, ≥85 degrees, or up to 90 degrees. The angle θ between the two rotation axes may be, for example 5 degrees to 35 degrees. These examples refer to the magnitude of the angle between the rotation axes. The angles may be positive or negative. The angle between a rotation axis and the horizontal may be, for example, ≥0 degrees, ≥5 degrees, ≥10 degrees, ≥15 degrees, ≥20 degrees, ≥25 degrees, ≥30 degrees, ≥35 degrees, ≥40 degrees, ≥45 degrees, ≥50 degrees, ≥55 degrees, ≥60 degrees, ≥65 degrees, ≥70 degrees, ≥75 degrees, ≥80 degrees, ≥85 degrees, or up to 90 degrees. These examples refer to the magnitude of the angle between a rotation axis and the horizontal. These angles may be positive or negative.

Referring again to FIG. 3B, contact between an inner annular face 340A of a rotation bearing 340 and a stepped surface 350 on a yoke 300 acts as a thrust bearing for an axial load directed toward the bearing assembly 220 along a rotation axis. Contact between an outer annular face 340B of a rotation bearing 340 and an inner annular face 345A of a sleeve 345 acts as a thrust bearing for an axial load directed away from the bearing assembly 220 along a rotation axis. In either case the axial load is transmitted through the thrust bearing to a pivoting vertical bearing support 315, then through side plates 355 to support post 110.

Other arrangements incorporating thrust bearings and/or slip joints with an articulating joint may also be used, as suitable. Such variations may include any suitable number or arrangement of torque transmitting drives that allows for translational motion.

Figure 4A:
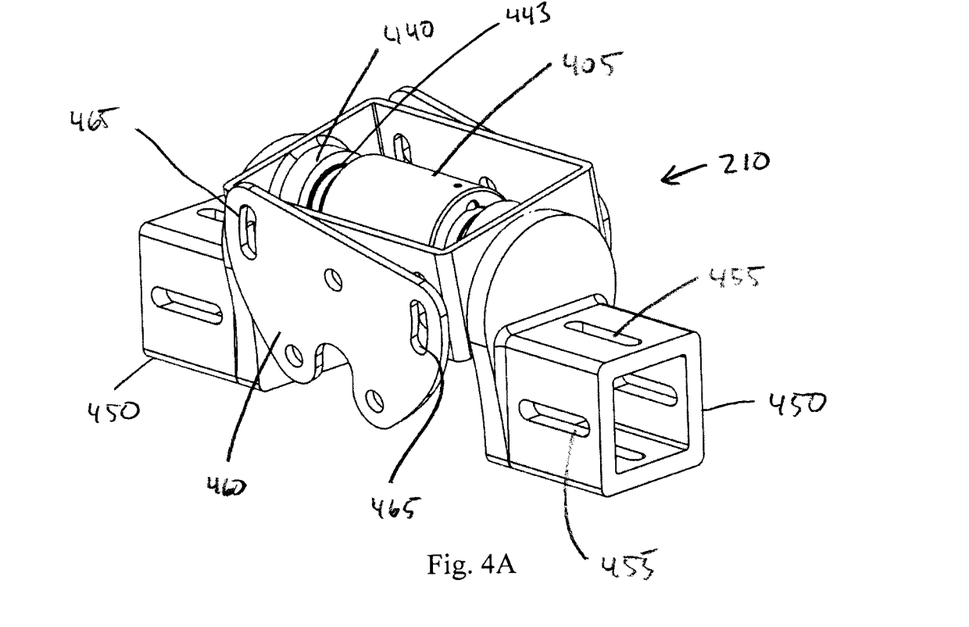
FIG. 4A and FIG. 4B show, respectively, assembled and exploded views of an example straight-through bearing assembly.
Figure 4B:
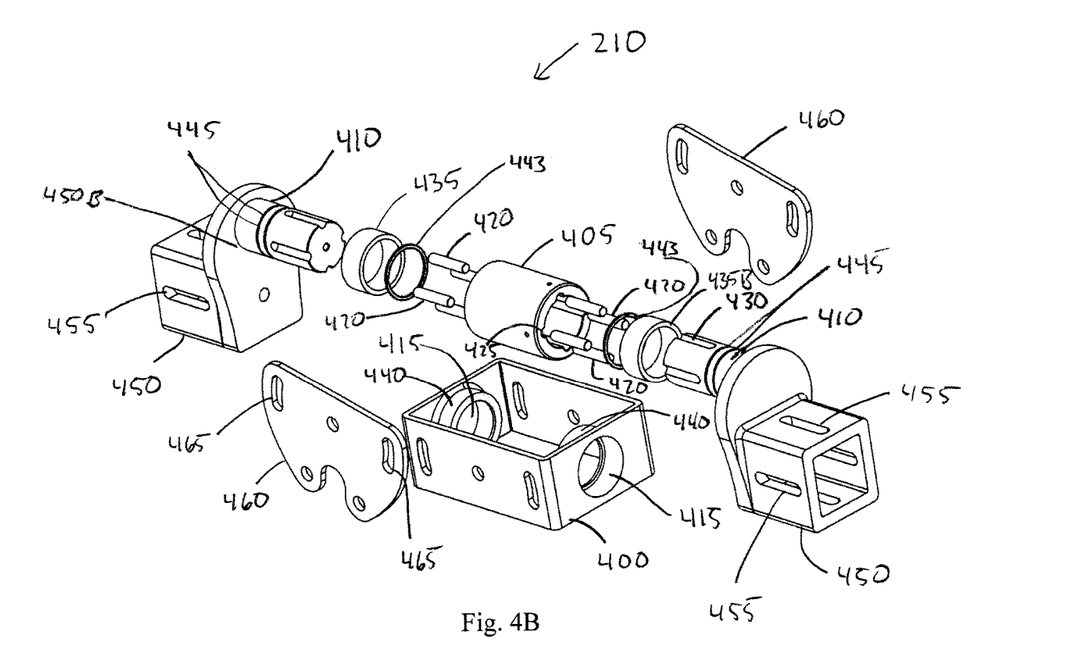

FIG. 4A and FIG. 4B show assembled and exploded views of an example straight-through bearing assembly 210. In this variation straight-through bearing assembly 210 includes a bearing support 400, a hollow cylindrical torque coupler 405 positioned within the bearing support, two shafts 410 that fit through oppositely positioned openings 415 in bearing support 400 to enter the internal hollow portion of torque coupler 405 from opposite sides, and a plurality of shear pins 420. Shear pins 420 each engage a complementary slot 425 in an internal surface of the torque coupler 405 and a complementary slot 430 on an external surface of one of the shafts to form a slip joint that transmits torque from one shaft, through the torque coupler, to the other shaft along the shared rotation axis of the two shafts while allowing relative motion of the shafts and the torque coupler along the rotation axis.

Rotation bearings 435 fitting over shafts 410 are retained in sleeves 440 of bearing support 400 to provide vertical support for shafts 410 while allowing rotation of the shafts about their shared rotation axis. Each shaft 410 is retained in position by a retaining ring 443 which engages one or the other of a pair of retaining ring grooves 445 on the shaft.

Bearing assembly 210 further includes two torque tube supports 450 each of which is attached to one of the shafts 410. A torque tube or equivalent longitudinal support (not shown) aligned parallel with and optionally displaced from the rotation axis of shafts 410 may be attached to one torque tube support 450, and another torque tube aligned parallel with and optionally displaced from the rotation axis of shafts 410 may be attached to the other torque tube support 450. In the illustrated example, when attached to bearing assembly 210 the torque tubes (or equivalent longitudinal supports) are aligned parallel with but displaced downward from the rotation axis when the panels they support are oriented horizontally. This configuration allows the rotation axis to lie in or close to the plane of the panels and/or in or close to the center of mass of the tracker, which can simplify operation of the tracker. Axial slots 455 in torque tube supports 450, by which a torque tube may be attached to the torque tube support, provide tolerance in the axial direction for support post placement.

Figure 4C:
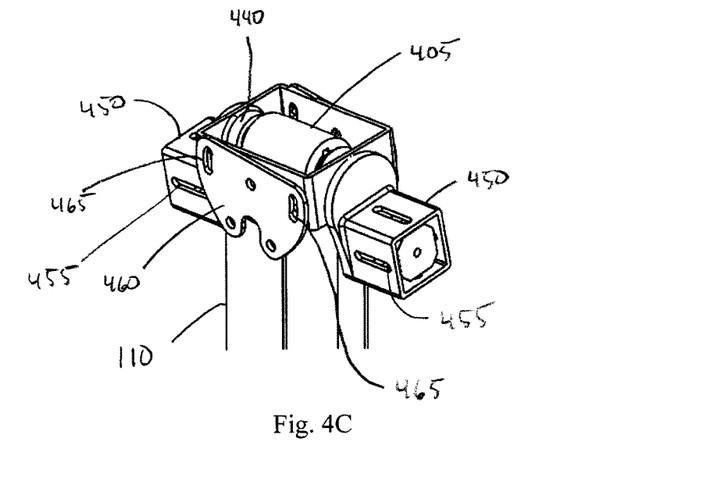
FIG. 4C shows a perspective view of the straight-through bearing assembly mounted on a support post.

As shown in FIG. 4C, side plates 460 of bearing assembly 210 may be used to attach pivoting bearing support 400 to a support post 110. Alignment slots 465 in side plates 460 allow the orientation of the rotation axis defined by shafts 410 to be adjusted to align with respect to neighboring bearing assemblies in the tracker while maintaining the support post in a vertical orientation. The angle between the rotation axis and the horizontal may be, for example, ≥0 degrees, ≥5 degrees, ≥10 degrees, ≥15 degrees, ≥20 degrees, ≥25 degrees, ≥30 degrees, ≥35 degrees, ≥40 degrees, ≥45 degrees, ≥50 degrees, ≥55 degrees, ≥60 degrees, ≥65 degrees, ≥70 degrees, ≥75 degrees, ≥80 degrees, ≥85 degrees, or up to 90 degrees. These examples refer to the magnitude of the angle between the rotation axis and the horizontal. The angles may be positive or negative with respect to the horizontal.

Referring again to FIG. 4B, contact between an outer annular face 435B of a rotation bearing 435 and an inner face 450B of a vertical plate portion of a torque tube support 450 acts as a thrust bearing for an axial load directed toward the bearing assembly along the rotation axis. Contact between a retaining ring and an annular surface of a sleeve 440 acts as a thrust bearing for an axial load directed away from bearing assembly 210 along the rotation axis. In either case the axial load is transmitted through the thrust bearing to bearing support 400, then through side plates 460 to support post 110.

Other arrangements incorporating thrust bearings and/or slip joints with a straight-through joint may also be used, as suitable.

Figure 5:
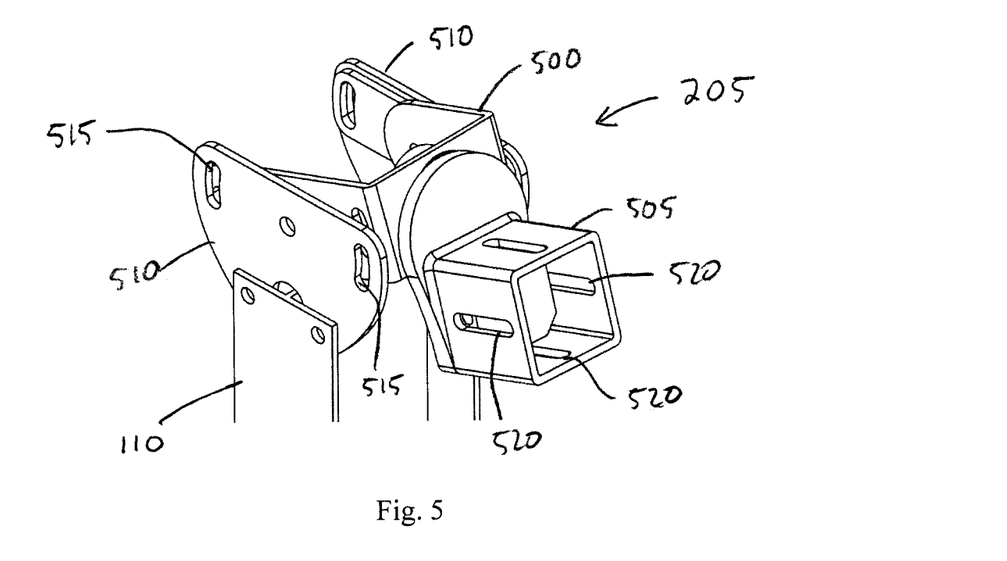
FIG. 5 shows an example row end bearing assembly mounted on a support post.

FIG. 5 shows an example row end bearing assembly 205 mounted on a support post 110. Bearing assembly 205 is similar to articulating joint bearing assembly 220 shown in FIGS. 4A-4C, except that bearing assembly 205 lacks an articulating joint. A rotation bearing (not shown) supported by pivoting bearing support 500 enables rotation of torque tube support 505 around an axis. Side plates 510 may be used to attach pivoting bearing support 500 to support post 110. Alignment slots 515 in side plates 510 allow the orientation of the rotation axis to be adjusted to align with respect to the neighboring bearing assembly in the tracker while maintaining the support post in a vertical orientation. The angle between the rotation axis and the horizontal may be, for example, ≥0 degrees, ≥5 degrees, ≥10 degrees, ≥15 degrees, ≥20 degrees, ≥25 degrees, ≥30 degrees, ≥35 degrees, ≥40 degrees, ≥45 degrees, ≥50 degrees, ≥55 degrees, ≥60 degrees, ≥65 degrees, ≥70 degrees, ≥75 degrees, ≥80 degrees, ≥85 degrees, or up to 90 degrees. These examples refer to the magnitude of the angle between the rotation axis and the horizontal. The angles may be positive or negative with respect to the horizontal.

A torque tube or equivalent longitudinal support (not shown) aligned parallel with and optionally displaced from the rotation axis may be attached to torque tube support 505 using axial slots 520, which provide tolerance for support post placement along the direction of the rotation axis. In the illustrated example, when attached to the row end bearing assembly the torque tube (or equivalent longitudinal support) is aligned parallel with but displaced downward from the rotation axis when the panels it supports are oriented horizontally. This configuration allows the rotation axis to lie in or close to the plane of the panels and/or in or close to the center of mass of the tracker, which can simplify operation of the tracker.

Figure 6:
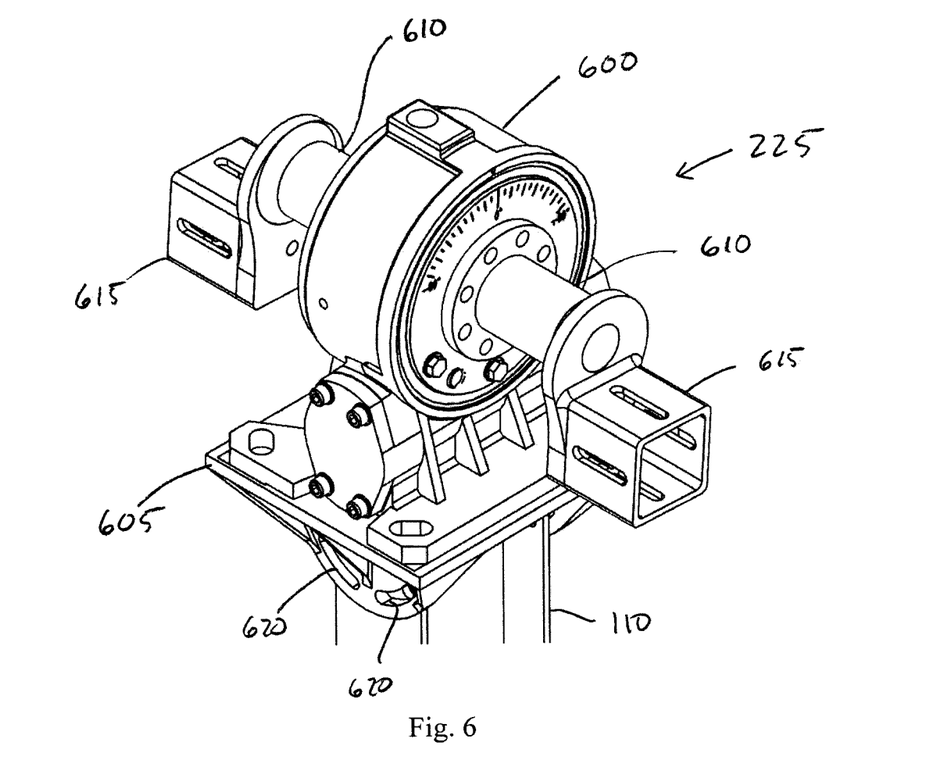
FIG. 6 shows an example slew drive assembly mounted on a support post.

FIG. 6 shows an example slew drive assembly 225 mounted on a support post 110.

Slew drive assembly 225 includes a slew drive 600 supported by a slew drive base 605, shafts 610 attached to and driven by slew drive 600 to rotate around a shared rotation axis, and torque tube supports 615 attached to drive shafts 610. Slots 620 in slew drive base 605 by which slew drive base 605 may be attached to support post 110 allow the orientation of slew drive assembly 225 to be adjusted to align the slew drive rotation axis with neighboring bearing assemblies. The angle between the rotation axis and the horizontal may be, for example, ≥0 degrees, ≥5 degrees, ≥10 degrees, ≥15 degrees, ≥20 degrees, ≥25 degrees, ≥30 degrees, ≥35 degrees, ≥40 degrees, ≥45 degrees, ≥50 degrees, ≥55 degrees, ≥60 degrees, ≥65 degrees, ≥70 degrees, ≥75 degrees, ≥80 degrees, ≥85 degrees, or up to 90 degrees. These examples refer to the magnitude of the angle between the rotation axis and the horizontal. The angles may be positive or negative with respect to the horizontal.

A torque tube or equivalent longitudinal support (not shown) aligned parallel with and optionally displaced from the rotation axis of shafts 610 may be attached to one torque tube support 615, and another torque tube aligned parallel with and optionally displaced from the rotation axis of shafts 610 may be attached to the other torque tube support 615. In the illustrated example, when attached to slew drive assembly 225 the torque tubes (or equivalent longitudinal supports) are aligned parallel with but displaced downward from the rotation axis when the panels they support are oriented horizontally. This configuration allows the rotation axis to lie in or close to the plane of the panels and/or in or close to the center of mass of the tracker, which can simplify operation of the tracker. Axial slots 625 in torque tube supports 615 by which a torque tube may be attached to the torque tube support, provide tolerance in the axial direction for support post placement.

Figure 7:
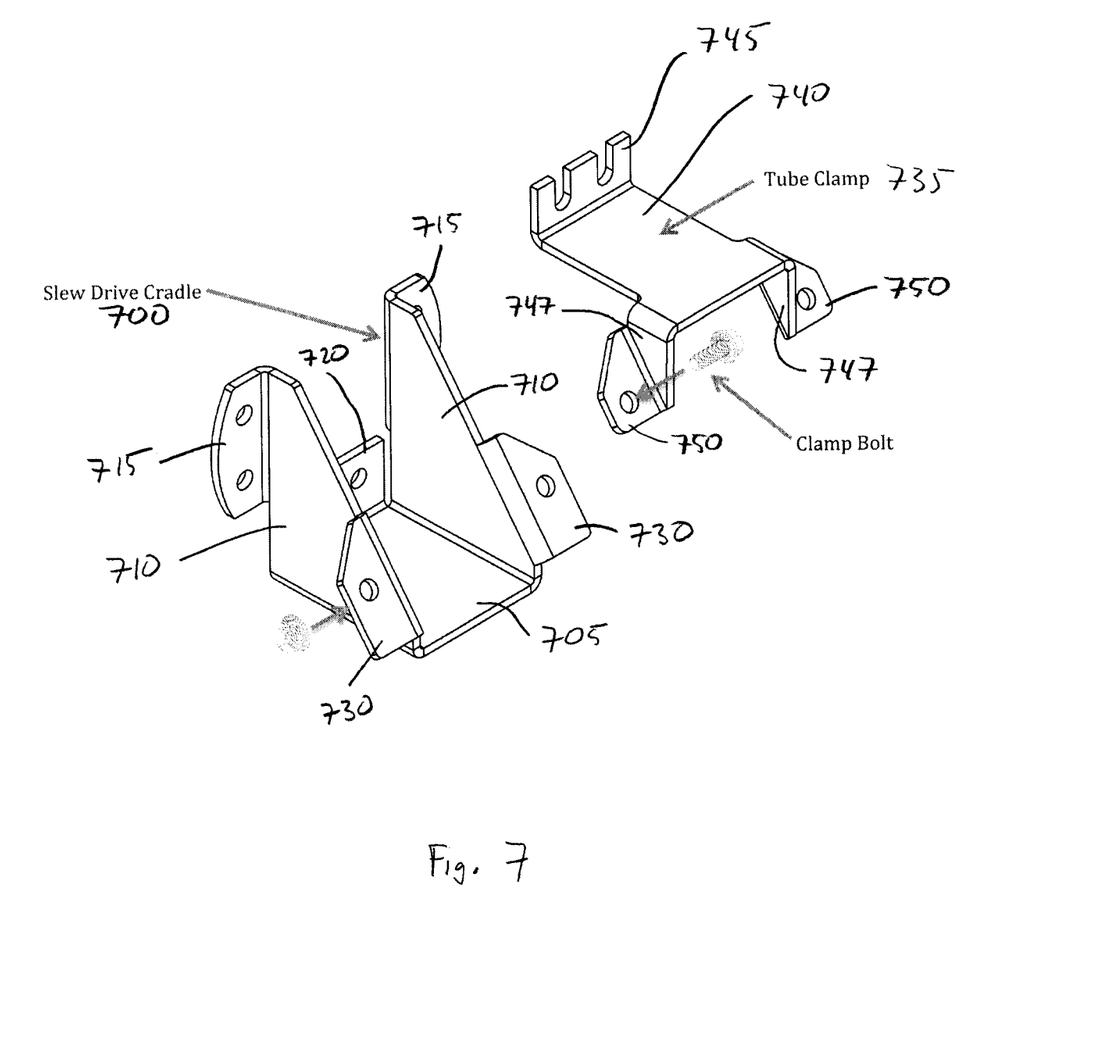
FIG. 7 shows an example torque tube cradle and clamp mechanism for use with a variation of the slew drive assembly of FIG. 6.
Figure 8A:
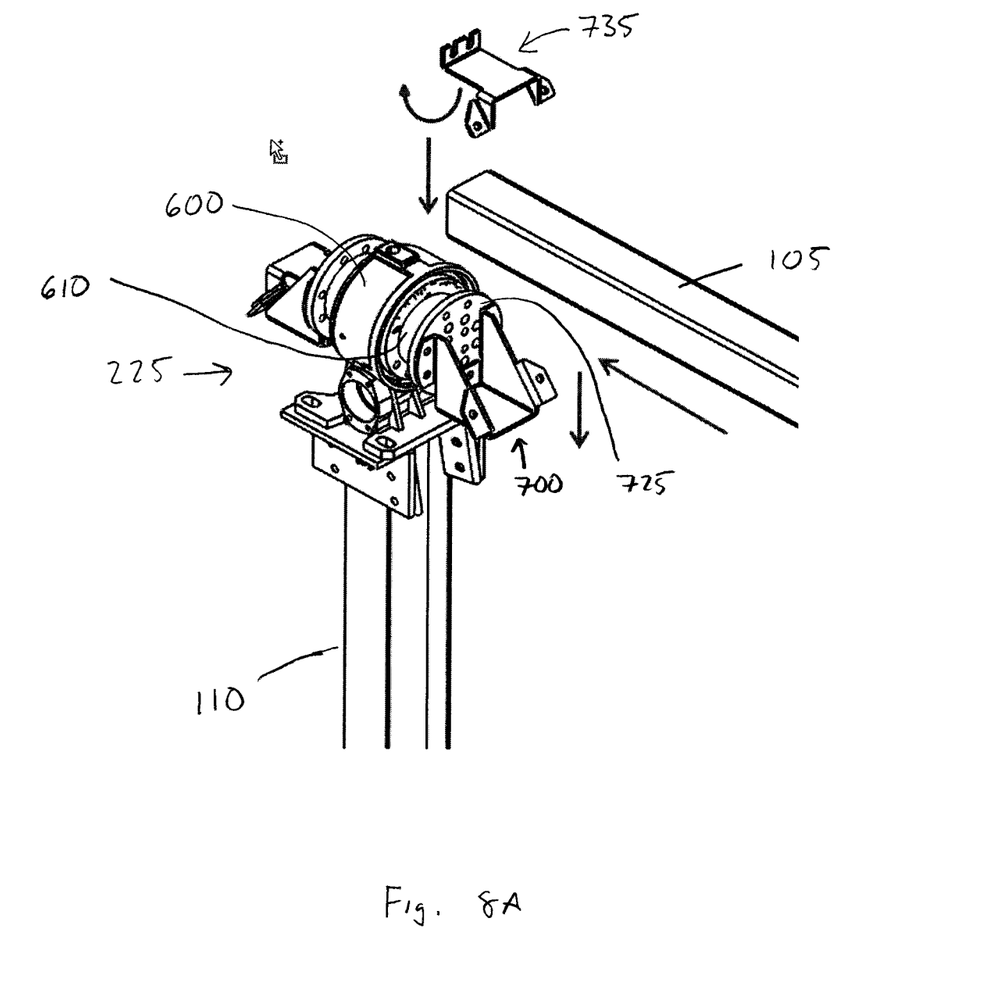
FIG. 8A and FIG. 8B show use of the torque tube cradle and clamp mechanism of FIG. 7 to attach a torque tube to a slew drive.
Figure 8B:
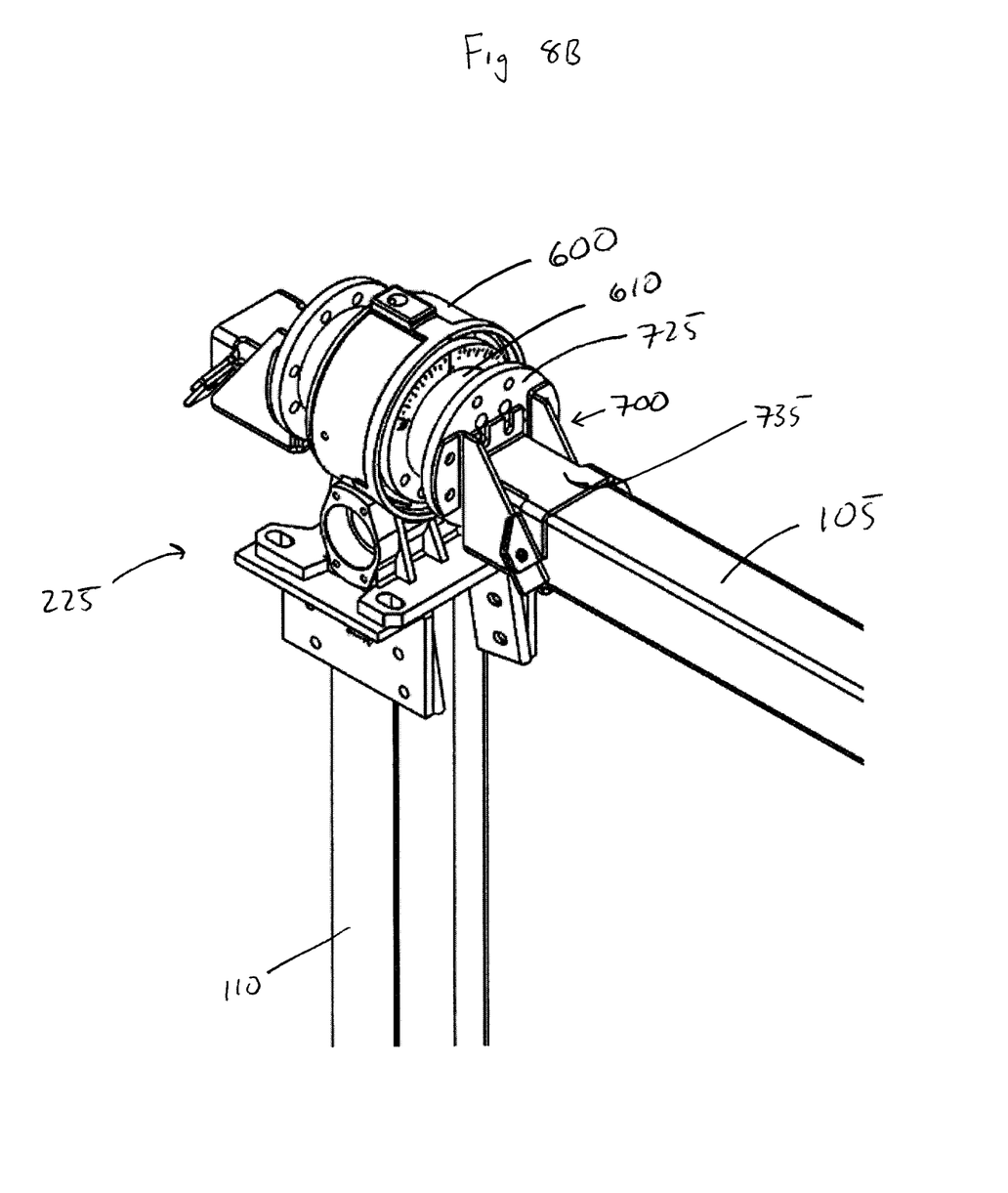

The example bearing assemblies and the slew drive assembly described above may optionally be adapted to replace their torque tube supports (e.g., 310, 450, 505, and 615) with a torque tube cradle and clamp mechanism. Referring to FIG. 7, FIG. 8A and FIG. 8B, for example, a slew drive assembly 225 may include torque tube cradles 700 in place of the torque tube supports 615 shown in FIG. 6. In the illustrated example a torque tube cradle 700 comprises a bottom panel 705 and two oppositely positioned side panels 710 attached to bottom panel 705 and projecting upwards perpendicularly from side edges of bottom panel 705. Bottom panel 705 and side panels 710 together form a cradle configured and dimensioned to support a torque tube 105. A bracket 715 projects outward perpendicularly from the rear edge of each side panel 710. Similarly, a bracket 720 projects outward perpendicularly from the rear edge of bottom panel 705. Brackets 715 and 720, which are coplanar, are configured and dimensioned to be attached to an adapter plate 725 on a drive shaft 610 in slew drive assembly 225 via bolts or other fasteners, for example, passing through holes or slots in the brackets.

Side panels 710 of torque tube cradle 700 have upper edges that slope backward and upward from bottom panel 705, from the front toward the rear of the cradle. A bracket 730 projects outward from the sloping upper edge of each side panel 710, perpendicularly to the side panel. The plane of bracket 730 slopes backward and upward from the front toward the rear of the cradle.

As shown in FIG. 8A for example, the end of a torque tube 105 may be placed in and supported by a torque tube cradle 700, after which a torque tube clamp 735 may be used to clamp the torque tube in place in the cradle. In the illustrated example, torque tube clamp 735 comprises an upper panel 740, a rear bracket 745 projecting outward and upward perpendicularly from a rear edge of upper panel 740, and side panels 747 projecting downward and perpendicularly from side edges of upper panel 740. A bracket 750 projects perpendicularly outward from each side panel 747. The plane of bracket 750 slopes backward and upward from the front to the rear of the torque tube clamp.

In use (e.g., FIG. 8B), torque tube clamp 735 nests partially inside torque tube cradle 700 over torque tube 105 with torque tube clamp brackets 750 overlying correspondingly arranged torque tube cradle brackets 730. Brackets 750 are attached to corresponding brackets 730 by fasteners (e.g. bolts) passing through holes or slots in the brackets. A cam mechanism provided by rear bracket 745 of torque tube clamp 735 engaging and pushing off of features on slew drive adapter plate 725 increases the positive clamping force retaining torque tube 105 in the cradle. In the illustrated example, rear bracket 745 comprises slots that engage bolts on slew drive adapter plate 725 to provide the cam action. Any other suitable configuration for torque tube cradle 700 and torque tube clamp 735 may also be used.

Figure 9:
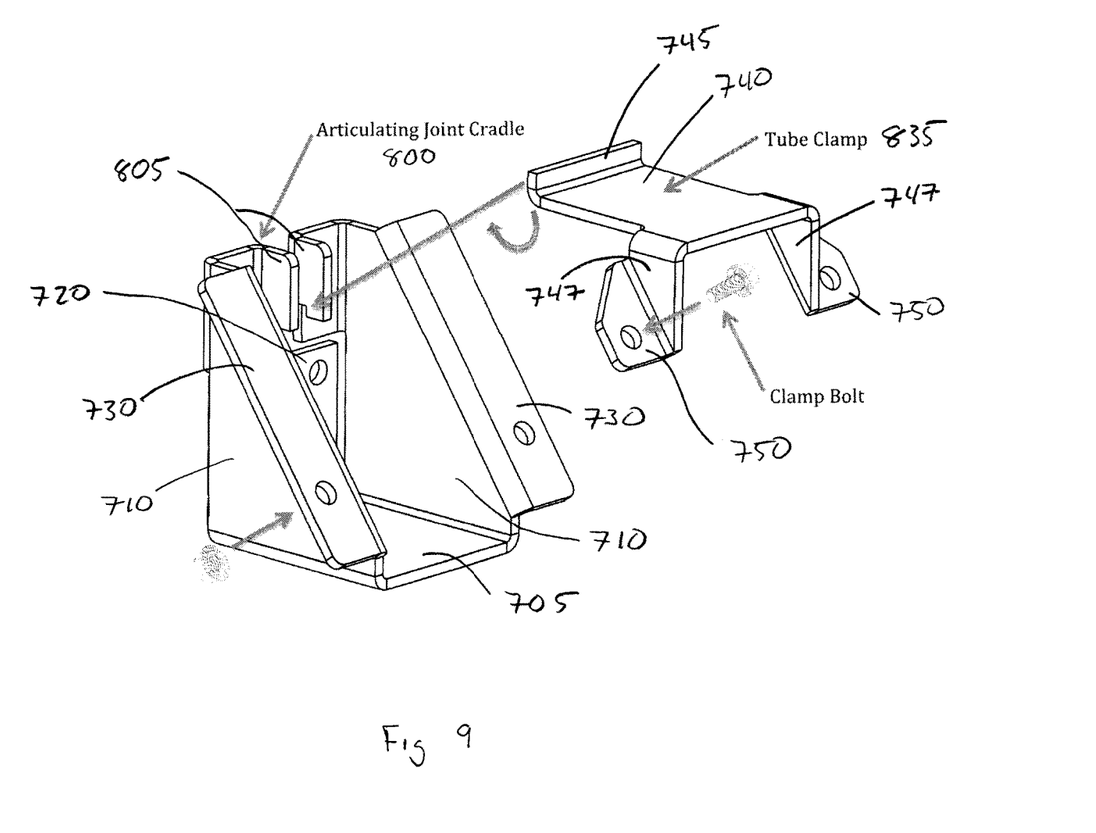
FIG. 9 shows an example torque tube cradle and clamp mechanism for use with a variation of the articulating bearing joint assembly of FIGS. 3A-3C, the straight-through bearing assembly of FIG. 4A-4C, or the row end bearing assembly of FIG. 5.
Figure 10A:
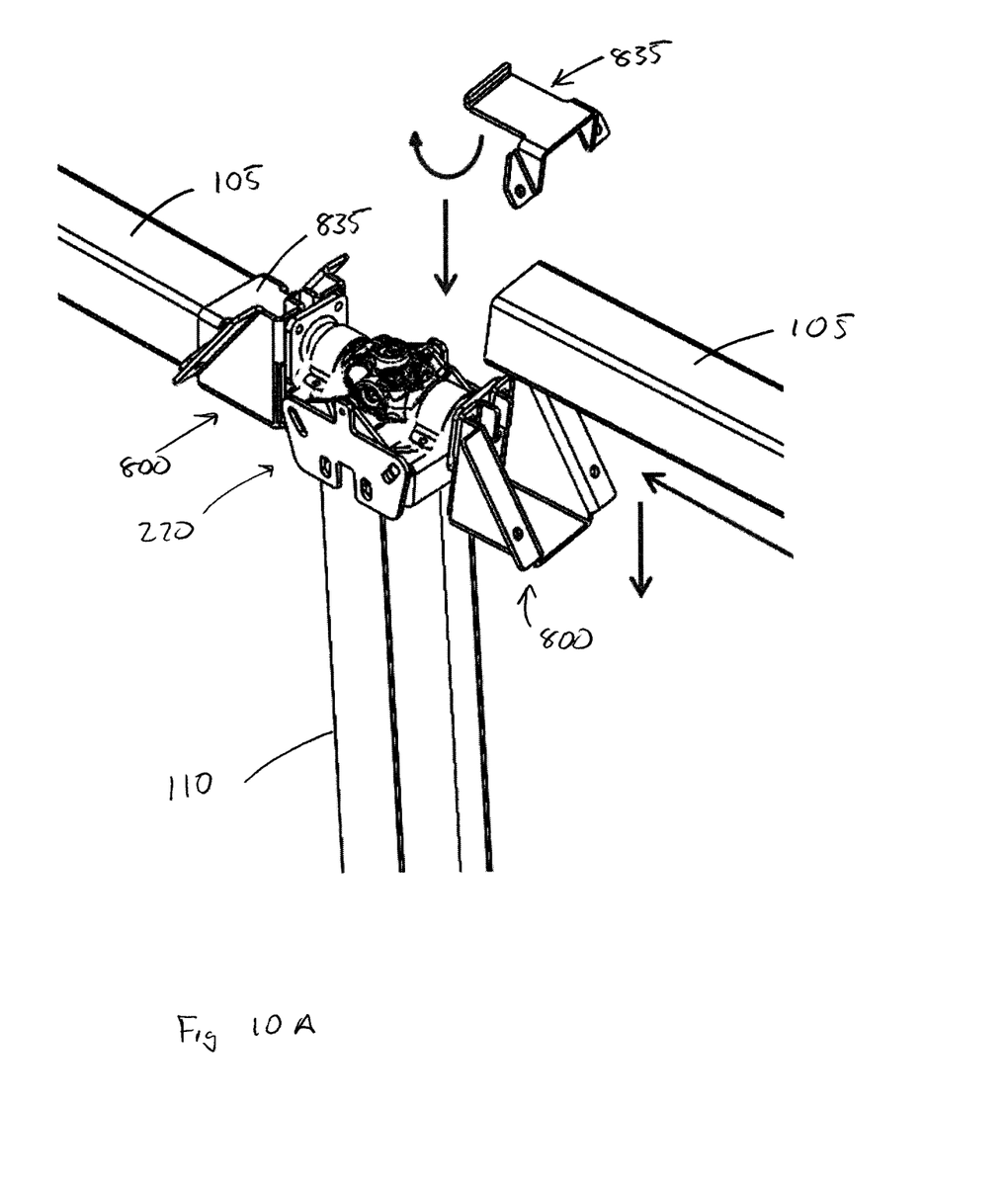
FIG. 10A and FIG. 10B show use of the torque tube cradle and clamp mechanism of FIG. 9 to attach a torque tube to an articulating bearing joint assembly.
Figure 10B:
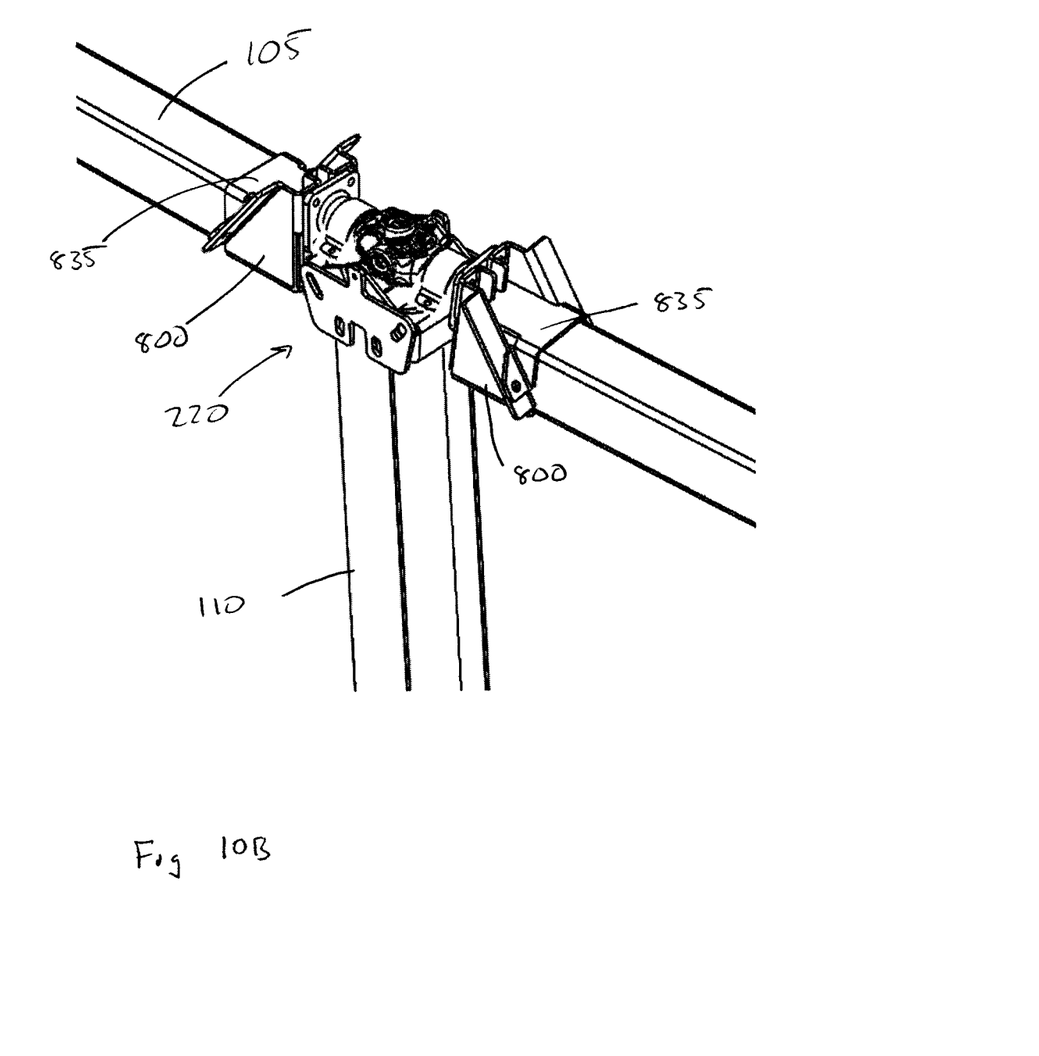

As another example, referring now to FIG. 9, FIG. 10A and FIG. 10B, an articulating joint bearing assembly 220 may include torque tube cradles 800 in place of the torque tube supports 310 shown in FIGS. 3A-3C. As shown in FIG. 10A for example, the end of a torque tube 105 may be placed in and supported by a torque tube cradle 800, after which a torque tube clamp 835 may be used to clamp the torque tube in place in the cradle.

Torque tube cradle 800 is similar in structure to torque tube cradle 700 described above, except for lacking brackets 715 and including bent tabs 805 attached to rear portions of side walls 710 near their tops and projecting forward inside the cradle. Bracket 720 of torque tube cradle 800 is dimensioned and configured to attach to a rotating component of articulating joint bearing assembly 220 via bolts or other fasteners, for example, passing through holes or slots in the brackets. Bent tabs 805 may also be dimensioned and configured for attaching to bearing assembly 220 via bolts or other fasteners, for example, through holes or slots in the bent tabs.

Torque tube clamp 835 is similar in structure to torque tube clamp 735 described above. In use (e.g., FIG. 10B), torque tube clamp 835 nests partially inside torque tube cradle 800 over torque tube 105 with torque tube clamp brackets 750 overlying correspondingly arranged torque tube cradle brackets 730. Brackets 750 are attached to corresponding brackets 730 by fasteners (e.g. bolts) passing through holes or slots in the brackets. A cam mechanism provided by rear bracket 745 of torque tube clamp 835 engaging and pushing off of bent tabs 805 on torque tube cradle 800 increases the positive clamping force retaining torque tube 105 in the cradle. Any other suitable configuration for torque tube cradle 800 and torque tube clamp 835 may also be used.

Torque tube cradle 800 and torque tube clamp 835 may be similarly employed in variations of end bearing assembly 205 and straight-through bearing assembly 210.

Use of the torque tube cradle and clamp mechanisms described above can streamline torque tube installation and simplify torque tube manufacturing. These mechanisms allow use of a simple torque tube section precut to length with no features or penetrations in the tube wall, allow the torque tube to be inserted in a direction most ergonomically advantageous (e.g., from above) as determined by the construction crew, and may accommodate pre-assembly of torque tube sections with modules and clamps before being connected to the post foundations. Bearing assemblies may be rotated in place on top of a support post to allow alternative installation orientations.

In the examples described above, row end bearing assembly 205, straight-through bearing assembly 210, and articulating joint bearing assembly 220 are modular (e.g., have a standardized and similar size and shape) and include identical or substantially identical components (e.g., side plates 355, 460, and 510) adapted to mount the bearing assembly onto a support post. This makes these bearing assemblies easily interchangeable on a support post, which facilitates assembly in the field and adaptation of tracker geometry to the underlying terrain. Non-modular designs for these bearing assemblies may also be employed, as suitable.

The bearing assemblies described above, when installed in a tracker, may passively damp torsional and bending mode vibrations in the tracker in a frequency range of, for example, 1 Hz-10 Hz.

The bearing assemblies described above may provide a high allowance for installation tolerance along the rotation axis as well as along two axes perpendicular to the rotation axis and to each other.

Some functional features of the bearing assemblies described above may instead or additionally be integrated into the support post. For example, slip joints and/or axial load bearing surfaces may be integrated into the support posts.

This disclosure is illustrative and not limiting. Further modifications will be apparent to one skilled in the art in light of this disclosure and are intended to fall within the scope of the appended claims.

What is claimed is:

1. A solar tracker comprising:
a first support post;
a first bearing assembly attached to the first support post; and
a first solar panel support having a first support axis and configured to support a first solar panel assembly and a second solar panel support having a second support axis and configured to support a second solar panel assembly, the first solar panel support and the second solar panel support attached to the first bearing assembly, the first bearing assembly:
comprising a torque coupler enabling rotation of the first solar panel support around a first rotation axis offset from the first support axis;
comprising a first support coupler configured to support and be in direct contact with the first solar panel support and a second support coupler configured to support and be in direct contact with the second solar panel support, the first support coupler and the second support coupler each comprising a coupler shaft inserted into the torque coupler that is directly attached to an axial load bearing surface arranged to support an axial load from a respective one of the first solar panel support and the second solar panel support and transfer the axial load through the first bearing assembly to the first support post; and
comprising a slip joint disposed over the first support post and arranged to accommodate relative motion, over the first support post, between the first solar panel support and the torque coupler; and
wherein the coupler shafts of the first support coupler and the second support coupler are inserted into the torque coupler from opposite ends.

2. The solar tracker of claim 1, wherein the first support coupler comprises an attachment plate having a first surface facing away from the first bearing assembly and the axial load bearing surface is comprised on the attachment plate on an opposite side of the first surface.

3. The solar tracker of claim 2, wherein the first support coupler comprises a first holder extending from the first surface.

4. The solar tracker of claim 2, wherein the coupler shaft of the first support coupler extending from the axial load bearing surface is coaxial with the first rotation axis.

5. The solar tracker of claim 1, wherein the first bearing assembly comprises a bearing support through which the coupler shaft of the first support coupler extends.

6. The solar tracker of claim 1, wherein the first bearing assembly further comprising a rotation bearing around the coupler shaft of the first support coupler.

7. The solar tracker of claim 3, wherein a center axis of the coupler shaft of the first support coupler does not intersect with a center axis of the first holder.

8. The solar tracker of claim 3, wherein the first holder comprises axial slots configured to attach the first solar panel assembly.

9. The solar tracker of claim 1, wherein the relative motion results from expansion and contraction of the first solar panel support.

10. The solar tracker of claim 1, wherein the relative motion results from displacement of the first solar panel support with respect to the first bearing assembly.

11. The solar tracker of claim 1, wherein the relative motion is along the first rotation axis.

12. The solar tracker of claim 1, wherein:
the first bearing assembly enables rotation of the second solar panel support around a second rotation axis that is arranged in line with the first rotation axis, and couples the first solar panel support to the second solar panel support so that that rotation of the first solar panel support causes rotation of the second solar panel support.

13. The solar tracker of claim 12, wherein the first bearing assembly comprises a first plurality of shear pins each of which engages a complementary slot on the coupler shaft of the first support coupler and a complementary slot on an internal surface of the torque coupler, and a second plurality of shear pins each of which engages a complementary slot on the coupler shaft of the second support coupler and a complementary slot on the internal surface of the torque coupler.

14. The solar tracker of claim 1, wherein the first rotation axis is adjustably oriented at an angle greater than 90 degrees with respect to a long axis of the first support post.

15. The solar tracker of claim 1, wherein the first bearing assembly is a modular bearing assembly selected from the group consisting of row end bearing assemblies and straight through bearing assemblies.

16. The solar tracker of claim 1, wherein the first support post extends in a vertical direction, and the first solar panel support does not overlap in the vertical direction with the first support post.

17. The solar tracker of claim 1, wherein the first bearing assembly comprises a cradle and a clamp, wherein the cradle supports the first end of the first solar panel support, and the clamp retains the first end of the first solar panel support in the cradle.

* * * * *